3,516,985
Patented June 23, 1970

3,516,985
INDOLE RIBOFURANOSIDES
Edward Walton, Scotch Plains, and Frederick W. Holly, Cranford, N.J., assignors to Merck & Co., Inc., Rahway, N.J., a corporation of New Jersey
No Drawing. Continuation-in-part of application Ser. No. 547,414, May 4, 1966. This application June 28, 1968, Ser. No. 741,196
Int. Cl. C07c 95/04
U.S. Cl. 260—211.5      10 Claims

ABSTRACT OF THE DISCLOSURE

Novel 4-substituted indole ribofuranosides are prepared by condensing a 1,2,3,5-tetra-O-acyl-D-ribofuranose with a 4-substituted indoline to form a 2,3,5-tri-O-acyl-D-ribofuranosyl 4-substituted indoline intermediate, which is then oxidized to produce the corresponding indole. The acyl groups are then removed by basic solvolysis. The 4-substituted indole ribofuranosides are useful as screening agents for ultraviolet rays.

CROSS REFERENCES TO RELATED APPLICATIONS

This application is a continuation-in-part of our copending application Ser. No. 547,414, filed May 4, 1966, now abandoned.

DESCRIPTION OF THE PREFERRED EMBODIMENTS

This invention relates to novel and useful ribofuranosides. More particularly, the present invention relates to novel ribofuranosides that are useful in their own right and are also useful in the preparation of other more complicated ribofuranosides. Specifically, the present invention relates to novel 4-substituted indole ribofuranosides.

The novel compounds of the present invention may be represented by the following structural formula:

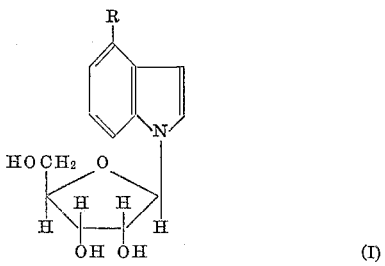

wherein R is hydrogen, hydroxy, lower alkyl, lower alkoxy, amino, alkylamino, dialkylamino or halo.

The object of the present invention is to provide novel 4-substituted indole ribofuranosides which may be reacted to form a variety of different ribofuranosides. When used as intermediates, the compounds of the present invention may be utilized in the preparation of 5′-phosphorylated derivatives of various 4-substituted indole ribofuranosides by their reaction with phosphorus compounds.

Other additional objects of the present invention will become apparent to those skilled in the art by reading the following specification.

Typical of the R groups in the compounds of the present invention, Compounds I, are hydrogen; alkyl such as methyl, ethyl, and propyl; alkoxy such as methoxy, ethoxy, and propoxy; amino; alkylamino groups such as methylamino, dimethylamino, ethylamino, diethylamino, propylamino, dipropylamino; halogens such as chlorine and bromine.

The compounds of the present invention are prepared in general by a three-step process. The first step in this process, Step A, is a condensation reaction and is carried out by treating a 1,2,3,5-tetra-O-acyl-D-ribofuranose of the following formula:

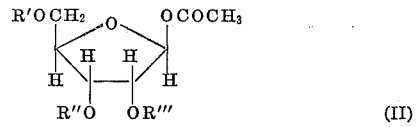

with a 4-substituted indoline of the formula

to form 2,3,5-tri-O-acyl-D-ribofuranosyl-4-substituted indoline intermediates of the formula

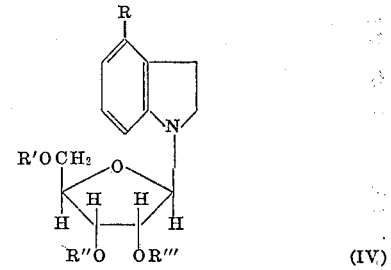

wherein R is hydrogen, hydroxy, lower alkyl, lower alkoxy, amino, alkylamino, dialkylamino or halo; R′, R″, and R‴ may be the same or different acyl groups. The reaction should be carried out in a temperature range of from about 25° C. to about 150° C. and preferably between 50° C. and 100° C. for a period of time to complete the reaction. This time is usually from about 1 hour to about 24 hours. It should be noted that the higher the reaction temperature range, the quicker the reaction will be complete.

The reaction depicting Step A in the preparation of the compounds of the present invention is as follows:

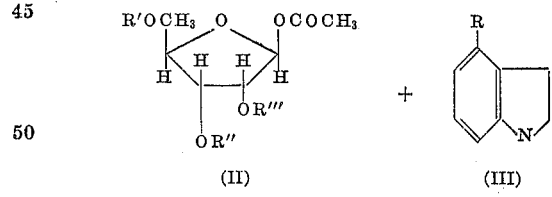

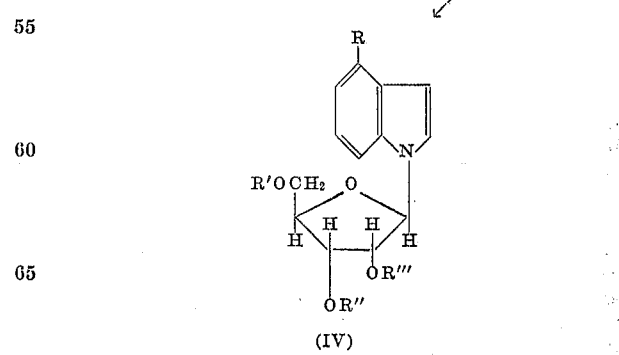

The second step in this process, Step B, is an oxidation reaction and is carried out by treating the 2,3,5-tri-O-acyl-D-ribofuranosyl 4-substituted indoline intermediates (Compound IV) obtained in Step A with a suitable oxidizing agent such as quinones. The reaction depicting Step B in the preparation of the compounds of the present invention is as follows:

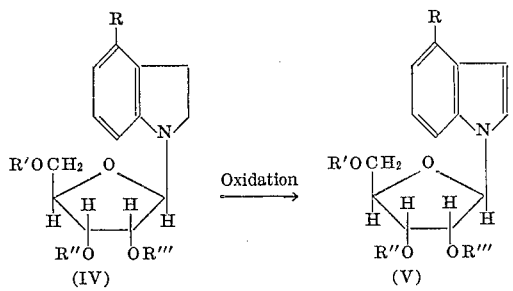

(IV)                (V)

wherein the R, R', R" and R'" are the same as above. This reaction should be carried out in a temperature range of from about 20 C. to about 150° C. and preferably between about 100° C. and 140° C. for a period of time to complete the oxidation. This time is usually from about 1 hour to about 16 hours, depending on the selection of the oxidant and the compound to be oxidized.

The third step in this process, Step C, is a solvolysis reaction and is carried out by treating the 2,3,5-tri-O-acyl-D-ribofuranosyl-4-substituted indole, Compound V, in a solvent with an appropriate basic catalyst, wherein R, R', R", and R'" are the same as above.

More specifically, the compounds of the present invention are obtained by the reaction in Step A of a 1,2,3,5-tetra-O-acyl-D-ribofuranose with a 4-substituted indoline essentially stoichiometrically, at a temperature range of from about 25° C. to about 150° C. and preferably between 50° C. and 100° C. In this step the reaction is carried out in an appropriate solvent with an acidic catalyst. The selection of the solvent and the acidic solvent is not important as long as it is an inert solvent and that it boils in a range of about 25 C. to 150° C. Examples of such solvents are lower alkanols, ethers, chlorinated hydrocarbons and the like.

Examples of the acid catalysts are acetic acid, propionic acid, butyric acid, benzoic acid, and the like. The lower alkanols are the preferred solvents and the preferred acid catalysts are acetic and propionic acids. The reaction is normally completed in from about 3 hours to about 8 hours, depending upon the selection of the reaction temperature.

After obtaining the intermediate reaction product in Step A the compounds are then oxidized to the corresponding indole and thereafter solvolized to the compounds of the present invention. The oxidation reaction takes place in the presence of oxidizing agents such as benzoquinone, 2,3-dichloro-6-dicyanobenzoquinone and tetrachlorobenzoquinone in an appropriate solvent. Examples of such solvents are alkanols, chlorinated hydrocarbons, aromatic hydrocarbons and the like, the preferred solvent being xylene, said oxidation reaction taking place in a temperature range of 120° C. to 140° C. for a period of time from 4 hours to 6 hours. The solvolysis reaction is carried out in a temperature range of from about 25° C. to about 150° C. in a reaction time of from about 5 minutes to about 20 hours. It should be noted that when alcohols are used as the solvent in the reaction the operating temperature and the reaction time should be selected from the lower ends of these ranges. However, when water is used as the solvent the reaction temperature is selected from the higher end of the range and the reaction time is selected from the longer end of that range. The length of the reaction time is dependent upon the temperature, the catalysts and the solvent used. Examples of the basic catalyst are alkali and alkaline earth bases and their corresponding alkoxides, solutions of ammonia, amines and substituted amines. Examples of the solvents are water and lower alkanols. The preferred solvent is water.

Representative of the novel compounds of the present invention but not limited to these compounds are 1-(D-ribofuranosyl)-indole
1-(D-ribofuranosyl)-4-methylindole
1-(D-ribofuranosyl-4-ethylindole
1-(D-ribofuranosyl)-4-propylindole
1-(D-ribofuranosyl)-4-methoxyindole
1-(D-ribofuranosyl)-4-ethoxyindole
1-(D-ribofuranosyl)-4-propoxyindole
1-(D-ribofuranosyl)-4-aminoindole
1-(D-ribofuranosyl)-4-methylaminoindole
1-(D-ribofuranosyl)-4-dimethylaminoindole
1-(D-ribofuranosyl)-4-ethylaminoindole
1-(D-ribofuranosyl)-4-diethylaminoindole
1-(D-ribofuranosyl)-4-propylaminoindole
1-(D-ribofuranosyl)-4-dipropylominoindole
1-(D-ribofuranosyl)-4-chloroindole
1-(D-ribofuranosyl)-4-bromoindole
1-(D-ribofuranosyl)-4-hydroxyindole The compounds of the present invention are suitable for use as screening agents for ultraviolet light. In particular, they are useful as stabilizing agents for plastics against deterioration by ultraviolet light. It is well known that most if not all plastics undergo deterioration when exposed to sunlight and air. Recent advances in plastic technology have made available a large variety of plastics. It has thus become increasingly important to provide materials which will stabilize plastics from deterioration due to ultraviolet light.

The stabilizer is incorporated in the plastic or other substrate in a stabilizing concentration ranging from about 0.05% to about 12% by weight.. The preferred concentration is about 0.5% to about 2% by weight of the substrate. The stabilizer may be incorporated in the plastic in any suitable manner and at any suitable stage of preparation. Since the stabilizer itself may inhibit polymerization of the monomer, generally it is preferred to incorporate the stabilizer after the plastic has been formed. For example, the plastic may be recovered in the form of a powder, pellets, cylinders, spheres, sheets, etc., and these may then be mixed with the stabilizer in any suitable manner, such as partly melting the plastic and adding the stabilizer to the hot melt. The plastic can be heated on a steam-heated two-roll mill of conventional commercial deisgn, for example, and the stabilizer may be added during this operation. The plastic containing the stabilizer is recovered in sheet form and may be fabricated in any desired fashion. The stabilizer may be added, however, in any other suitable manner.

The stabilizer may be used as such or it may be utilized as a solution in a suitable solvent, such as alcohol, benzene, and xylene. The solvent employed should not be harmful to the plastic and, therefore, the preferred solvent is the same solvent as that used during the preparation of the plastic.

The stabilizer may be used with other additives incorporated in plastics for various purposes and they may also be used along with other ultraviolet light stabilizers.

The following examples are given for purposes of illustration and not by way of limitation:

EXAMPLE 1.—PREPARATION OF 1-(D-RIBOFURANOSYL)-INDOLE

A solution of 6 grams (11.8 mmoles) of 1-acetyl-2,3,5-tri-O-benzoyl-D-ribofuranose in 60 ml. of ethanol is refluxed with 4.2 grams (35.6 mmoles) of indoline and 4.2 ml. of acetic acid. The reaction is followed by thin layer chromatography on silica using ethyl acetate-benzene in a 1:19 ratio. After 6.5 hours the reaction is judged to be complete and the ethanol is removed at reduced pressure. The residue in 125 ml. of chloroform is washed with two 50-ml. portions of water and concentration of the dried solution gives 11 grams of residual oil. The oil is chromatographed on a short column of silica using ethyl acetate-benzene in a ratio of 1:19 as the eluent. Fractions containing mostly 1-(2,3,5-tri-O-benzoyl-D-ribofuranosyl)-indoline are combined and give 3.9 grams of oil. After treatment in ethanol with a small amount of decolorizing carbon the solvent is removed and the residual oil, 3.4 grams, is rechromatographed on 25 grams of silica using benzene as the eluent. This removes some of the minor impurities and gives 3.0 grams (45% yield) of 1-(2,3,5-tri-O-benzoyl-D-ribofuranosyl)-indoline.

A solution of 2.8 grams (5 mmoles) of 1-(2,3,5-tri-O-benzoyl-D-ribofuranosyl)-indoline in 90 ml. of dried xylene is treated with 1.14 grams (5 mmoles) of 2,3-dichloro-5,6-dicyanobenzoquinone. A deep red mixture is obtained and is refluxed. After 5 hours of refluxing the cool reaction mixture is filtered and the filtrate is concentrated. The residual oil, 3 grams, is chromatographed on 25 grams of silica gel in ethyl acetate-benzene in a ratio of 1:19 and 2.2 grams (78% yield) of 1-(2,3,5-tri-O-benzoyl-D-ribofuranosyl)-indole is obtained.

A suspension of 860 mg. (1.5 mmoles) of 1-(2,3,5-tri-O-benzoyl-D-ribofuranosyl)-indole in 10 ml. of dry methanol is treated with a solution made from 28 mg. (1.2 mmoles) of sodium and 15 ml. of methanol, and the mixture is refluxed for one hour. Methanolysis is complete in about 5 minutes. The methanol is concentrated and 5 ml. of ether and 10 ml. of water is added to the residue. Carbon dioxide is bubbled through the mixture for one hour after which the pH of the aqueous phase is 7. The ether layer is removed, and the aqueous layer is extracted with 10 ml. portions of ether. The ether extracts are concentrated and the resulting product crystallized. Recrystallization from 65 ml. of water gives 1.0 mg. of purified 1-(D-ribofuranosyl)-indole.

EXAMPLE 2.—PREPARATION OF 1-(D-RIBOFURANOSYL)-4-AMINOINDOLE

A solution of 6 grams (11.8 mmoles) of 1-acetyl-2,3,5-tri-O-benzoyl-D-ribofuranose in 60 ml. of ethanol is refluxed with 8.6 grams (35.6 mmoles) of 4-benzamidoindoline and 4.2 ml. of acetic acid. The reaction is followed by thin layer chromatography on silica using ethyl acetate-benzene in a 1:19 ratio. After 6.5 hours the reaction is judged to be complete and the ethanol is removed at reduced pressure. The residue in 125 ml. of chloroform is washed with two 50-ml. portions of water and concentration of the dried solution gives 11 grams of residual oil. The oil is chromatographed on a short column of silica using ethyl acetate-benzene in a ratio of 1:19 as the eluent. Fractions containing mostly 1-(2,3,5-tri-O-benzoyl-D-ribofuranosyl)-4-benzamidoindoline are combined and give 3.9 grams of oil. After treatment in ethanol with a small amount of decolorizing carbon, the solvent is removed and the residual oil, 3.4 grams, is rechromatographed on 25 grams of silica using benzene as the eluent. This removes some of the minor impurities and gives 3.0 grams (45% yield) of 1-(2,3,5-tri-O-benzoyl-D-ribofuranosyl)-4-benzamidoindoline.

A solution of 3.42 grams (5 mmoles) of 1-(2,3,5-tri-O-benzoyl-D-ribofuranosyl)-4-benzamidoindoline in 90 ml. of dried xylene is treated with 1.14 grams (5 mmoles) of 2,3-dichloro-5,6-dicyanobenzoquinone. A deep red mixture is obtainned and is refluxed. After 5 hours of refluxing, the cooled reaction mixture is filtered and the filtrate is concentrated. The residual oil, 3 grams, is chromatographed on 25 grams of silica gel in ethyl acetate-benzene in a ratio of 1:19 and 2.2 grams (78% yield) of 1-(2,3,5-tri-O-benzoyl)-D-ribofuranosyl)-4-benzamidoindole is obtained.

A mixture of 600 mg. (0.88 mmole) of 1-(2,3,5-tri-O-benzoyl-D-ribofuranosyl)-4-benzamidoindole, 60 ml. of water, and 19.2 gams of $Ba(OH)_2 \cdot 8H_2O$ is heated, with shaking, in a sealed tube for 16 hours at 130° C. The tube is cooled and the precipitated $Ba(OH)_2$ is removed by filtration and the filtrate is concentrated to a small volume. The insoluble salts are removed and the filtrate is concentrated to dryness. The residue is leached with several portions of isopropanol. Concentration of the isopropanol gives a residue (131 mg.) which contains the product. By treating the insoluble salts above in a similar manner an additional 78 mg. of crude product is obtained. The combined product is chromatographed in ethyl acetate on 11 grams of silica gel. Combination of those fractions containing only the desired products and concentration of the solvent gives a residue of 93 mg. (40% yield) of 1-(D-ribofuranosyl)-4-aminoindole as an amorphous solid.

EXAMPLE 3.—PREPARATION OF 1-(D-RIBOFURANOSYL)-4-METHYLINDOLE

A solution of 5 grams (9.8 mmoles) of 1-acetyl-2,3-5-tri-O-benzoyl-D-ribofuranose in 50 ml. of ethanol is refluxed with 2.9 grams (25.8 mmoles) of 4-methylindoline and 3.5 ml. of acetic acid. After about 10 hours, the ethanol is removed at reduced pressure. The residue in 125 ml. of chloroform is washed with two portions of water, dried and concentrated to a residual oil. Chromatography of the oil on silica gel is benzene-ethyl acetate (19:1) gives essentially pure 1-(2,3,5-tri-O-benzoyl-D-ribofuranosyl)-4-methylindoline.

A solution of 2.3 grams (5.0 mmoles) of 1-(2,3,5-tri-O-benzoyl-D-ribofuranosyl)-4-methylindoline in 80 ml. of dry xylene is treated with 1.14 grams (5.0 mmoles) of 2,3-dichloro-5,6-dicyanobenzoquinone and the resultant mixture is refluxed for 5 hours. The mixture is cooled and filtered and the filtrate is concentrated. The residual oil is chromatographed on 25 grams of silica gel in benzene-ethyl acetate (19:1) and purified 1-(2,3,5-tri-O-benzoyl-D-ribofuranosyl)-4-methylindole is obtained.

A suspension of 820 mg. (1.4 mmoles) of 1-(2,3,5-tri-O-benzoyl-D-ribofuranosyl)-4-methylindole in 10 ml. of dry methanol is treated with a solution prepared from 23 mg. (1.0 mmole) of sodium and 15 ml. of methanol and the mixture is refluxed for one hour. The methanol is concentrated and 5 ml. of ether and 10 ml. of water is added to the residue. Carbon dioxide is bubbled through the mixture for one hour after which the pH of the aqueous solution is reduced to about 7. The ether layer is removed and the aqueous layer is extracted with several 10 ml. portions of ether. Concentration of the ether layer gives a residue of 1-(D-ribofuranosyl)-4-methylindole.

EXAMPLE 4.—PREPARATION OF 1-(D-RIBOFURANOSYL)-4-ETHOXYINDOLE

A solution of 6 grams (11.8 mmoles) of 1-acetyl-2,3,5-tri-O-benzoyl-D-ribofuranose in 60 ml. of ethanol is refluxed with 5.8 grams (3,5,6 mmoles) of 4-ethoxyindoline and 4.2 ml. of acetic acid. After 6.5 hours the ethanol is removed at reduced pressure and the residue in 125 ml. of chloroform is washed with two 50-ml. portions of water. Concentration of the chloroform layer gives a residue which is chromatographed on silica in benzene-ethyl acetate (19:1) to give purified 1-(2,3,5-tri-O-benzoyl-D-ribofuranosyl)-4-ethoxyindoline.

A solution of 3.0 grams (5 mmoles) of 1-(2,3,5-tri-O-benzoyl-D-ribofuranosyl)-4-ethoxyindoline in 90 ml. of dry xylene is treated with 1.14 grams (5 mmoles) of 2,3-dichloro-5,6-dicyanobenzoquinone and the mixture is refluxed for 5 hours. The mixture is cooled, filtered and the filtrate is concentrated. The residue is chromatographed on silica gel in a mixture of benzene and ethyl acetate to give purified 1-(2,3,5-tri-O-benzoyl-D-ribofuranosyl)-4-ethoxyindole.

A suspension of 1.2 grams (2 mmoles) of 1-(2,3,5-tri-O-benzoyl-D-ribofuranosyl)-4-ethoxyindole in 15 ml. of dry methanol is treated with a solution prepared from 34 mg. (1.5 mmoles) of sodium and 20 ml. of methanol and the mixture is refluxed for one hour. The methanol is concentrated and 5 ml. of ether and 10 ml. of water is added to the residue. Carbon dioxide is bubbled through the solution for one hour which lowers the pH of the aqueous phase to 7. The ether layer is removed and the aqueous layer is extracted with several 10-ml. portions of ether. Concentration of the ether extracts gives 1-(D-ribofuranosyl)-4-ethoxyindole.

EXAMPLE 5.—PREPARATION OF 1-(D-RIBOFURANOSYL)-4-METHYLAMINOINDOLE

A solution of 6 grams (11.8 mmoles) of 1-acetyl-2,3,5-tri-O-benzoyl-D-ribofuranose in 60 ml. of ethanol is refluxed with 9.0 grams (35.6 mmoles) of 4-(n-methyl)-benzamidoindoline and 4.2 ml. of acetic acid. After 6.5 hours the ethanol is removed at reduced pressure. The residue in 125 ml. of chloroform is washed with two 50-ml. portions of water, dried and concentrated to a residual oil. The oil is chromatographed on silica in benzene-ethyl acetate (19:1) to obtain purified (1-(2,3,5-tri-O-benzoyl-D-ribofuranosyl) - 4 - N - methyl) - benzamidoindoline.

A solution of 3.48 grams (5 mmoles) of 1-(2,3,5-tri-O-benzoyl-D-ribofuranosyl)-4-(N - methyl)benzamidoindoline in 90 ml. of dried xylene is treated with 1.14 grams (5 mmoles) of 2,3-dichloro-5,6-dicyanobenzoquinone. The mixture is refluxed for 5 hours, cooled and filtered. The filtrate is concentrated at reduced pressure and the residual oil is chromatographed on silica gel in benzene-ethyl acetate (19:1) which gives purified 1-(2,3,5-tri-O-benzoyl-D-ribofuranosyl) - 4 - (N - methyl) benzamidoindole.

A mixture of 600 mg. (0.9 mmole) of 1-(2,3,5-tri-O-benzoyl-D-ribofuranosyl)-4-(N - methyl) - benzamidoindole in 60 ml. of water and 19.2 grams of

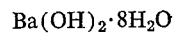

is heated with shaking in a sealed tube for 16 hours at 130° C. The tube is cooled and the precipitated Ba(OH)$_2$ is removed by filtration and the filtrate is concentrated to a small volume. The insoluble salts are removed and the filtrate is concentrated to dryness. The residue is leached with isopropanol. The isopropanol solution is concentrated and pure 1-(D-ribofuranosyl)-4-methylaminoindole is obtained after chromatographing the residue on silica gel in ethyl acetate.

EXAMPLE 6.—PREPARATION OF 1-(D-RIBOFURANOSYL)-4-DIETHYLAMINOINDOLE

A solution of 6 grams (11.8 mmoles) of 1-acetyl-2,3,5-tri-O-benzoyl-D-ribofuranose in 60 ml. of ethanol is refluxed with 6.8 grams (35.6 mmoles) of 4-diethylaminoindoline and 4.2 ml. of acetic acid. After 6.5 hours, the ethanol is removed at reduced pressure and the residue in 125 ml. of chloroform is washed with two 50-ml. portions of water. Concentration of the chloroform layer gives a residue which after chromatography on silica gel in a mixture of benzene and ethyl acetate yields purified 1 - (2,3,5-tri-O-benzoyl-D-ribofuranosyl)-4-diethylaminoindole.

A solution of 3.2 grams (5 mmoles) of 1-(2,3,5-tri-O-benzoyl-D-ribofuranosyl)-4-diethylaminoindoline in 90 ml. of dry xylene is treated with 1.14 grams (5 mmoles) of 2,3-dichloro-5,6-dicyanobenzoquinone. The mixture is refluxed for 5 hours, cooled and filtered. The filtrate is concentrated and the residue is chromatographed on silica gel in a mixture of ethyl acetate and benzene to give 1 - (2,3,5-tri-O-benzoyl-D-ribofuranosyl)-4-diethylaminoindole.

A suspension of 950 mg. (1.5 mmoles) of 1-(2,3,5-tri-O-benzoyl-D-ribofuranosyl)-4-diethylaminoindole in 10 ml. of dry methanol is treated with a solution prepared from 23 mg. (1 mmole) of sodium and 15 ml. of methanol and the mixture is refluxed for one hour. The methanol is concentrated and 5 ml. of ether and 10 ml. of water is added. Carbon dioxide is bubbled through the mixture for one hour and the pH drops to 7. The ether layer is removed and the aqueous phase is extracted with several 10 ml. portions of ether. Concentration of the ether extracts gives 1-(D-ribofuranosyl)-4-diethylaminoindole.

EXAMPLE 7.—PREPARATION OF 1-(D-RIBOFURANOSYL)-4-HYDROXYINDOLE

A solution of 5 grams (9.8 mmoles) of 1-acetyl-2,3,5-tri-O-benzoyl-D-ribofuranose in 50 ml. of ethanol is refluxed with 4.0 grams (29.8 mmoles) of 4-hydroxyindoline and 3.5 ml. of acetic acid. After about 10 hours, the ethanol is removed at reduced pressure. The residue in 125 ml. of chloroform is washed with two portions of water, dried and concentrated to a residual oil. Chromatography of the oil on silica gel in benzene-ethyl acetate (19:1) gives essentially pure 1-(2,2,5-tri-O-benzoyl-D-ribofuranosyl)-4-hydroxyindoline. The product in 50 ml. of acetic anhydride is heated to the reflux temperature for about one hour. The solution is concentrated to dryness and a residue of 1-(2,3,5-tri-O-benzoyl-D-ribofuranosyl)-4-acetoxyindoline is obtained.

A solution of 2.6 grams (5.0 mmoles) of 1-(2,3,5-tri-O-benzoyl-D-ribofuranosyl)-4-acetoxyindoline in 80 ml. dry xylene is treated with 1.14 grams (5.0 mmoles) of 2,3-dichloro-5,6-dicyanobenzoquinone and the resultant mixture is refluxed for 5 hours. The mixture is cooled and filtered and the filtrate is concentrated. The residue oil is chromatographed on 25 grams of silica gel in a mixture of benzene and ethyl acetate and purified 1-(2,3,5-tri-O-benzoyl-D-ribofuranosyl)-4-acetoxyindole is obtained.

A suspension of 720 mg. (1.4 mmoles) of 1-(2,3,5-tri-O-benzoyl-D-ribofuranosyl)-4-acetoxyindole in 10 ml. of dry methanol is treated with a solution prepared from 23 mg. (1.0 mmole) of sodium and 15 ml. of methanol and the mixture is refluxed for one hour. The methanol is concentrated and 5 ml. of ether and 10 ml. of water is added to the residue. Carbon dioxide is bubbled through the mixture for one hour after which the pH of the aqueous solution is reduced to about 7. The ether layer is removed and the aqueous layer is extracted with several 10 ml. portions of ether. Concentration of the ether layer gives a residue of 1-(D-ribofuranosyl)-4-hydroxyindole.

It should be understood that although this invention has been described with reference to particular embodiments thereof, changes and modifications may be made which are within its intended scope, and it should be limited only by the language of the appended claims.

What is claimed is:

1. Compounds of the formula

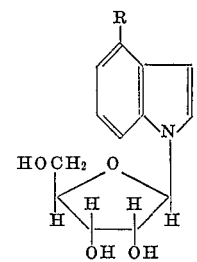

wherein R is hydrogen, hydroxy, lower alkyl, lower alkoxy, amino, loweralkylamino and di(loweralkyl)amino or halo.

2. The compound of claim 1 wherein R is hydrogen.
3. The compound of claim 1 wherein R is hydroxy.
4. The compound of claim 1 wherein R is amino.
5. The compound of claim 1 wherein R is halo.
6. The compound of claim 5 wherein said compound is 1-(D-ribofuranosyl)-4-chloroindole.

7. A method for producing a 4-substituted indole ribofuranoside of the formula

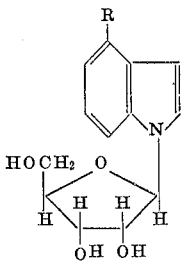

wherein R is hydrogen, hydroxy, lower alkyl, lower alkoxy, amino, loweralkylamino and di(loweralkyl)amino or halo which comprises, in Step A, treating a compound of the formula

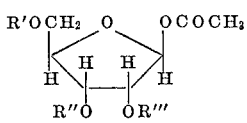
(II)

wherein R', R" and R'" are the same or different benzoyl groups, with a compound having the formula

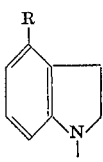
(III)

wherein R is the same as above to form the intermediate compound of the formula

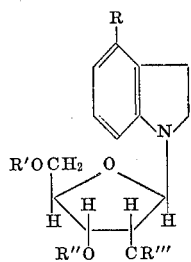
(IV)

wherein R, R', R" and R'" are the same as above and said Compound IV, in Step B, is subjected to oxidation with benzoquinone oxidizing agents to form the compound of the following formula

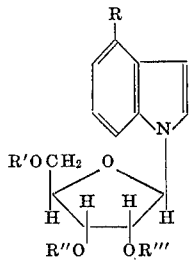
(V)

where R, R', R" and R'" are the same as above and said Compound V in Step C, is subjected to solvolysis to remove the blocking acyl groups, R', R" and R'".

8. The method according to claim 7 wherein the reaction in said Step A is carried out in a temperature range of from about 25° C. to about 150° C. and for a period of time of from about 1 hour to about 24 hours.

9. The method according to claim 7 wherein said oxidation reaction is carried out in the presence of a benzoquinone oxidizing agent and in a temperature range of from about 20° C. to about 150° C. for a period of time of from about 1 hour to about 16 hours.

10. The method according to claim 7 wherein said solvolysis reaction takes place in the presence of a basic catalyst and in lower alkanols or water as a solvent in a temperature range of from about 25° C. to about 150° C. for a period of time of from about 5 minutes to about 20 hours.

References Cited

UNITED STATES PATENTS 2,637,727   5/1953   Hodge _____ 260—211.5

ELBERT L. ROBERTS, Primary Examiner

J. R. BROWN, Assistant Examiner

U.S. Cl. X.R.
260—45.8; 350—3